US010732324B2

(12) United States Patent
Lechat et al.

(10) Patent No.: US 10,732,324 B2
(45) Date of Patent: Aug. 4, 2020

(54) METHOD FOR LAMINATING AN INTERFERENCE COATING COMPRISING AN ORGANIC/INORGANIC LAYER, AND ITEM THUS OBTAINED

(71) Applicant: ESSILOR INTERNATIONAL, Charenton-le-Pont (FR)

(72) Inventors: Céline Lechat, Charenton-le-Pont (FR); Karin Scherer, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 15/750,447

(22) PCT Filed: Aug. 5, 2016

(86) PCT No.: PCT/FR2016/052040
§ 371 (c)(1),
(2) Date: Feb. 5, 2018

(87) PCT Pub. No.: WO2017/021668
PCT Pub. Date: Feb. 9, 2017

(65) Prior Publication Data
US 2018/0231691 A1 Aug. 16, 2018

(30) Foreign Application Priority Data
Aug. 5, 2015 (FR) ..................... 15 57557

(51) Int. Cl.
*G02B 1/11* (2015.01)
*G02B 1/111* (2015.01)
(Continued)

(52) U.S. Cl.
CPC .............. *G02B 1/111* (2013.01); *B29C 67/00* (2013.01); *B29D 11/00* (2013.01);
(Continued)

(58) Field of Classification Search
CPC ..... G02B 1/111; B29D 11/00; B29D 11/0073; B29D 11/00865; B32B 27/28;
(Continued)

(56) References Cited

U.S. PATENT DOCUMENTS

| 5,508,368 A | 4/1996 | Knapp et al. |
| 6,180,033 B1 * | 1/2001 | Greshes ................ B29C 43/203 |
| | | 264/1.32 |

(Continued)

FOREIGN PATENT DOCUMENTS

| EP | 0614957 | 9/1994 |
| EP | 2018262 | 7/2010 |

(Continued)

OTHER PUBLICATIONS

International Search Report issued in International Patent Application No. PCT/FR2016/052040, dated Nov. 8, 2016.

*Primary Examiner* — Wen Huang
(74) *Attorney, Agent, or Firm* — Norton Rose Fulbright US LLP

(57) ABSTRACT

The invention relates to a method for preparing an optical system item having a non-zero radius of curvature and coated with an interference coating. Said method includes: a) providing a thermoplastic film coated with a multilayer interference coating containing at least one layer having a refractive index of greater than 1.65 and at least one layer having a refractive index of less than or equal to 1.65, at least one of the interference coating layers being a vacuum-deposited organic/inorganic layer, b) laminating said coated thermoplastic film, by means of an adhesive layer, onto an optical system item including a substrate, and c) recovering said optical system item, including a substrate coated with the adhesive layer, from the thermoplastic film and the multilayer interference coating.

17 Claims, 1 Drawing Sheet

(51) Int. Cl.
*B29D 11/00* (2006.01)
*B29C 67/00* (2017.01)
*B32B 37/12* (2006.01)
*B32B 3/00* (2006.01)
*B32B 27/28* (2006.01)
*C08J 7/06* (2006.01)
*C07F 7/08* (2006.01)

(52) U.S. Cl.
CPC ............ *B29D 11/0073* (2013.01); *B32B 3/00* (2013.01); *B32B 27/28* (2013.01); *B32B 37/12* (2013.01); *C08J 7/06* (2013.01); *B29D 11/00865* (2013.01); *B32B 2307/418* (2013.01); *B32B 2551/00* (2013.01); *C07F 7/0834* (2013.01); *C08J 2300/22* (2013.01)

(58) Field of Classification Search
CPC ..... B32B 37/12; B32B 3/00; B32B 2307/418; B32B 2551/00; C08J 7/06; C08J 2300/22; B29C 67/00; C07F 7/0834
USPC ......................................................... 359/586
See application file for complete search history.

(56) References Cited

U.S. PATENT DOCUMENTS

| 2002/0060849 A1 | 5/2002 | Matsunaga et al. |
| 2005/0095420 A1 | 5/2005 | Berni et al. |
| 2011/0051246 A1 | 3/2011 | Schulz et al. |
| 2014/0354945 A1 | 12/2014 | Martinu et al. |

FOREIGN PATENT DOCUMENTS

| EP | 2524798 | 11/2012 |
| FR | 3021247 | 11/2015 |
| FR | 3021248 | 11/2015 |
| WO | WO 2006/105999 | 10/2006 |
| WO | WO 2008/001011 | 1/2008 |
| WO | WO 2008/062142 | 5/2008 |
| WO | WO 2009/021793 | 2/2009 |
| WO | WO 2009/047426 | 4/2009 |
| WO | WO 2011/080472 | 7/2011 |
| WO | WO 2012/076714 | 6/2012 |
| WO | WO 2013/098531 | 7/2013 |
| WO | WO 2014/199103 | 12/2014 |

\* cited by examiner

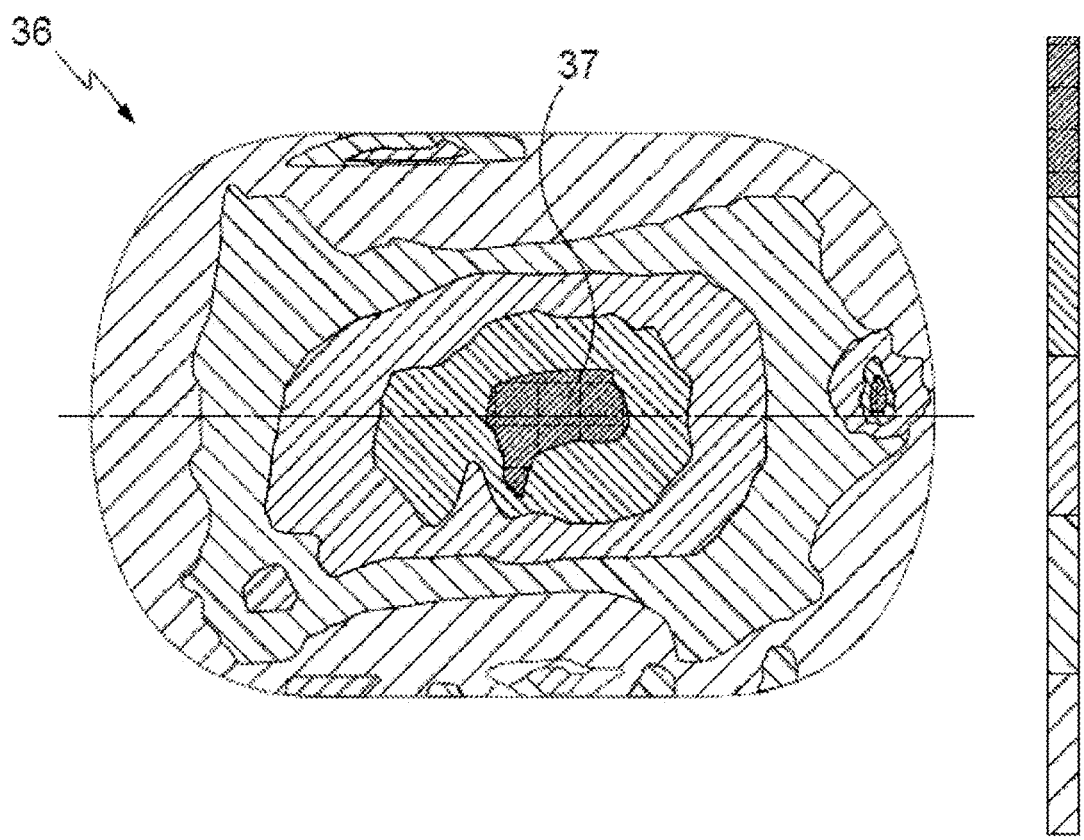

METHOD FOR LAMINATING AN INTERFERENCE COATING COMPRISING AN ORGANIC/INORGANIC LAYER, AND ITEM THUS OBTAINED

CROSS-REFERENCE TO RELATED APPLICATIONS

This application is a national phase application under 35 U.S.C. § 371 of International Application No. PCT/FR2016/052040 filed 5 Aug. 2016, which claims priority to French Patent Application No. 1557557 filed 5 Aug. 2015. The entire contents of each the above-referenced disclosures is specifically incorporated by reference herein without disclaimer.

The present invention relates to a process for applying a stack comprising an interference coating, in particular an antireflection coating, on a curved surface of an optical article substrate, preferably on the substrate of an ophthalmic lens, and to the optical article thus obtained.

It is known to coat optical articles such as ophthalmic lenses or screens with interference coatings, in particular antireflection coatings, that are generally formed from a multilayer stack of dielectric mineral materials such as SiO, $SiO_2$, $Si_3N_4$, $TiO_2$, $ZrO_2$, $Al_2O_3$, $MgF_2$ or $Ta_2O_5$.

One of the problems encountered for all types of mineral interference coatings is their great fragility mainly due to their mineral nature. These coatings may find it difficult to undergo a deformation or a substantial expansion since the stress experienced often results in cracking that propagates over the whole of the surface of the coating, generally making it unusable. Thus, interference coatings entirely of inorganic nature have a tendency to crack, including for small degrees of deformation, for example of the order of 1%.

Thus, during the trimming and fitting of an eyeglass at an opticians, the eyeglass undergoes mechanical deformations that may produce cracks in the interference coatings, in particular when the operation is not carried out with care. Similarly, thermal stresses (heating of the frame) can produce cracks in the interference coating. Depending on the number and the size of the cracks, the latter can interfere with the field of view of the wearer and prevent the eyeglass from being sold. Furthermore, while the treated organic eyeglasses are being worn, scratches can appear. In mineral interference coatings, some scratches lead to cracking, making the scratches more visible because of scattering of light.

Furthermore, it is often useful to bond a functionalized film to a curved face of an optical article such as an optical lens or a spectacle eyeglass, to give it a desired property. For example, the film may be a film comprising an interference coating, antistatic coating, polarizing coating, contrast-enhancing coating or photochromic coating.

Given that the face of the optical article is curved (convex or concave), and that the functional film is initially flat, delaminations, tears and/or creases may appear in the film when it is applied to the face of the optical article, due to the difference in curvature between this face and the film.

Application WO 2006/105999, in the name of the applicant, describes a process for laminating a functionalized flexible flat film onto an optical lens by conforming it to this lens. This process makes it possible to cover the whole of the surface of the lens but gives rise to increased deformations in the functionalized film, to the extent that it is usable preferably for optical articles having a small curvature.

Application WO 2009/021793, in the name of the applicant, makes it possible to laminate a functional film having a substantially flat initial shape onto a curved face of a substrate. It comprises a step of deforming the functional film to the curvature of the substrate, during which this functional film is retained on a face of a deformable auxiliary membrane by suitable connecting means so that the shape of the functional film varies in accordance with a deformation of the membrane, the functional film remaining parallel to the membrane, only the auxiliary membrane being held by mechanical means at its perimeter, the functional film being kept in contact with said auxiliary membrane only by said connecting means; and the connecting means are additionally suitable so that portions of the functional film can be displaced locally relative to and parallel to the membrane during the deformation step. The deformations of the functional film produced by this process are advantageously limited relative to the process of application WO 2006/105999, insofar as, at equal curvature, the process of application WO 2009/021793 results in a lower mechanical stress of the film, which limits the cracking thereof. This makes it possible to use articles with greater curvatures, but on the other hand the surface of the optical article substrate covered by the functionalized film is generally more limited, since it is necessary to use a functionalized film of smaller dimensions.

Moreover, since mineral (inorganic) interference coatings have a limited deformation at break, there is a maximum curvature for the substrates beyond which it is not possible to carry out the lamination of the film using the processes described above without cracking it. It is therefore desirable to broaden both the range accessible in terms of eyeglass curvature and useful area covered by the functional film.

Furthermore, the deformation of the functional film with a view to conforming it to the geometry of the surface of the curved optical article induces a shift of the optical properties of this film toward a set of values more or less distant from the target values, due in particular to the modification of the thicknesses of the layers of the stack taking place during the deformation. There is currently no solution other than to tolerate this shift of the optical properties relative to the target.

In order to limit the occurrence of degradations of the functional film, it is known to preform it, by giving it a suitable initial curvature before applying it to the substrate. In particular, the film may be preformed by a thermoforming. In this case, the heating of the film may make it more flexible so that the deformation of the film creates less damage therein. Nevertheless, such preforming gives rise to deformations in the film which are unfavorable, and which may produce degradations within the functionality of the film and/or of cosmetic order. Various systems of implementation are known but none results in a completely satisfactory result. This is particularly true in the case where the film is made to provide a function to a substrate such as an ophthalmic lens. In this case, in addition to the degradations of the functionality borne by the film and the appearance of cosmetic defects, dioptric degradations may be observed.

One objective of the present invention is therefore to provide a novel process for bonding a film to a curved substrate, in order to transfer a functional film by lamination in a more flexible manner, and for which process the deformations that are created in the functional film are reduced and generate fewer defects in the film. Advantageously, this process is used to provide in particular an interference functionality, by means of a functional film as described above, to a substrate. It will easily be understood that within this context of use, the process must make it possible to retain the optical or even dioptric properties of the optical article, and also the cosmetic properties thereof in order to guarantee an optimal optical transparency for such a functionalized object, in particular if it is intended to correct or protect vision. Finally, this process must make it possible to maintain the integrity of the function(s) present within the functional film when it passes from a flat surface to a curved surface.

Another objective of the invention is to propose an effective means for satisfactorily reducing the inherent fragility of mineral interference coatings and significantly increase the temperature or the stress beyond which the expansion or deformation of the coating causes the cracking thereof.

The invention is targeted in particular at articles possessing an improved critical temperature, that is to say exhibiting a good resistance to cracking when they are subjected to an increase in temperature. Another objective of the invention is to provide a process for manufacturing an article equipped with an interference coating that is simple, easy to carry out and reproducible.

These problems are solved according to the invention by modifying the nature of one or more inorganic layers of the interference coating, which one or more layers are replaced by one or more layers of organic-inorganic nature, i.e. layers based on compounds containing carbon and a metal or metalloid. These materials have an increased resistance to cracking or crazing and advantageously replace conventional inorganic materials such as titanium dioxide, zirconium dioxide or silica in interference coatings. The interference coating according to the invention may be deformed more, without suffering damage, than a conventional mineral interference coating.

The objectives set are therefore achieved according to the invention by a process for preparing an optical article having a non-zero radius of curvature coated with an interference coating, comprising the following steps:

a) providing a thermoplastic film coated with a multilayer interference coating, said interference coating comprising at least one layer having a refractive index of greater than 1.65 and at least one layer having a refractive index of less than or equal to 1.65, at least one of the layers of the interference coating being a layer of organic-inorganic nature that has been deposited under vacuum, b) laminating said coated thermoplastic film on an optical article comprising a substrate, by means of a layer of adhesive, said layer of adhesive being positioned between the optical article and the surface of the thermoplastic film not coated with the interference coating, c) recovering said optical article comprising a substrate coated with the layer of adhesive, the thermoplastic film and the multilayer interference coating.

The invention will be described in greater detail with reference to the appended drawing, in which FIG. 1 is a representation of the degrees of deformation measured on the surface of a functional thermoplastic film laminated to the surface of an optical article having a non-zero radius of curvature.

In the present patent application, when an article comprises one or more coatings at its surface, the expression "to deposit a layer or a coating on the article" means that a layer or a coating is deposited on the uncovered (exposed) surface of the external coating of the article, that is to say its coating furthest from the substrate.

A coating which is "on" a substrate or which has been deposited "on" a substrate is defined as a coating which (i) is positioned above the substrate, (ii) is not necessarily in contact with the substrate (although it preferably is in contact), that is to say one or more intermediate coatings can be positioned between the substrate and the coating in question, and (iii) does not necessarily completely cover the substrate (although it preferably covers it). When "a layer 1 is located under a layer 2", it will be understood that the layer 2 is further from the substrate than the layer 1.

Unless otherwise indicated, the thicknesses mentioned in the present patent application are physical thicknesses.

The article produced according to the invention comprises a substrate, preferably a transparent substrate, having front and back main faces, at least one of said main faces and preferably both main faces comprising an interference coating comprising at least one organic-inorganic layer. An organic-inorganic layer is defined as being a layer comprising atoms of carbon, of a metal or metalloid and preferably of oxygen. It is according to the invention obtained by vacuum deposition.

The "back face" of the substrate (the back face generally being concave) is understood to mean the face which, when the article is being used, is closest to the eye of the wearer. Conversely, the "front face" of the substrate (the front face generally being convex) is understood to mean the face which, when the article is being used, is furthest from the eye of the wearer.

The article according to the invention is an optical article, in particular an optical filter, better still an optical lens, and even better still an optionally corrective ophthalmic lens for spectacles, or an optical or ophthalmic lens blank such as a semi-finished optical lens, in particular a spectacle eyeglass, or a pair of protective glasses which can be used in particular in a working environment. The lens can be a polarized or tinted lens or a photochromic or electrochromic lens.

The substrate of the article according to the invention is preferably an organic glass, for example made of thermoplastic or thermosetting plastic. This substrate can be chosen from the substrates mentioned in the application WO 2008/062142, for example a substrate obtained by (co)polymerization of diethylene glycol bis(allyl carbonate), a substrate made of poly(thio)urethane or based on polyepisulfides or a substrate made of (thermoplastic) bisphenol A polycarbonate, denoted PC, or a substrate made of PMMA (polymethyl methacrylate).

The thermoplastic film according to the invention supporting an interference coating may be laminated on at least one of the main faces of a bare substrate, i.e. an uncoated substrate, or on at least one of the main faces of a substrate already coated with one or more functional coatings.

Before the thermoplastic film comprising the interference coating is deposited on the substrate, which is optionally coated, for example with an abrasion-resistant and/or scratch-resistant coating, it is common to subject the surface of said optionally coated substrate to a physical or chemical activation treatment intended to increase the adhesion of this coating. This pre-treatment is generally carried out under vacuum. It may be a bombardment with energetic and/or reactive species, for example an ion beam (ion pre-cleaning or IPC) or an electron beam, a corona discharge treatment, a glow discharge treatment, a UV treatment or a vacuum plasma treatment. It may also be an acidic or basic surface treatment and/or a surface treatment with solvents (water or organic solvent). These treatments are described in greater detail in application WO 2014/199103.

Similarly, before the deposition of the interference coating or other functional coatings on the thermoplastic film, its surface may be subjected to an activation or cleaning treatment such as the treatments envisaged above, in particular treatment with an aqueous solution of sodium hydroxide, concentrated to 10%, at 60° C. for 4 minutes, followed by a step of rinsing with softened water and drying with hot air (60° C.). Before the application of a layer of adhesive to a surface of this film, this surface is preferentially subjected to an oxygen plasma surface treatment under reduced pressure.

The multilayer interference coating according to the invention is formed on a main surface of a preformed thermoplastic film which fulfils a deformable support role. This film of polymer nature may be composed of one or more preferentially transparent polymers, i.e. a polymer having a light scattering of less than 0.5%, preferably between 0.2% and 0.3% and a transmission factor at least equal to 90%, preferably between 93% and 98% (these scattering and transmission factor measurements are carried out according to the ASTM D1003 standard on a Haze-Gard instrument).

Its glass transition temperature, measured by DMA (dynamic mechanical analysis) is above the usage temperature of the optical article, which is usually room temperature. The glass transition temperature of the film generally varies from 50° C. to 250° C., preferably from 70° C. to 200° C. At the usage temperature, the thermoplastic polymer film is not therefore in the plastic state but in the glassy state.

The thermoplastic film preferably comprises at least one polymer chosen from PET (polyethylene terephthalate), a polyurethane, COPs and COCs (cycloolefin polymers and copolymers), polycarbonate, poly(methyl methacrylate), polystyrene, polyvinyl alcohol, cellulose acetate butyrate (CAB), or a cellulose acetate such as cellulose triacetate (TAC), preferably PET and TAC. Ideally it is a film based on cellulose triacetate preferably having a glass transition temperature of between 100° C. and 180° C. or a film based on PET preferably having a glass transition temperature of between 50° C. and 150° C.

The thickness of this thermoplastic polymer film preferably varies from 30 to 500 µm, preferably from 50 µm to 200 µm, in particular from 60 µm to 100 µm.

This thermoplastic film may be coated on one of its faces directly with the interference coating according to the invention, or with an abrasion-resistant and/or scratch-resistant coating on which the interference coating will be formed.

The abrasion-resistant and/or scratch-resistant coating is preferably a coating of the nanocomposite varnish type based on silica dispersed in an organic matrix. Such varnishes are described in detail, for example in EP 0614957.

Among the abrasion-resistant and/or scratch-resistant coatings that can be used within the context of the invention, thermosetting coatings obtained from epoxyalkylalkoxysilanes, preferably comprising at least two hydrolysable groups, preferably at least three hydrolysable groups, bonded to the silicon atom, such as α-glycidoxypropyltrimethoxysilane (GLYMO), and from alkylalkoxysilanes, such as dimethyldiethoxysilane (DMDES), or from hydrolysates of these compounds, and from a catalyst such as aluminum acetylacetonate, will be noted. Preferentially, the abrasion-resistant coating also contains a colloidal compound, such as a metal oxide or silica. One particularly advantageous coating is described in example 3 of patent EP 0614957.

This abrasion-resistant and/or scratch-resistant coating may be applied according to known processes, for example by dip coating, by spin coating, by bar coating or by spray coating.

Its thickness is similar to that of the known abrasion-resistant and/or scratch-resistant coatings and generally varies from 1 to 15 µm, preferably from 2 to 10 µm.

The article according to the invention includes an interference coating comprising at least one organic-inorganic layer, which forms either a low-refractive-index layer of the in particular antireflection, multilayer interference coating, or a high-refractive-index layer.

In the present application, a layer, in particular a layer of the interference coating, is said to be a high-refractive-index layer when its refractive index is greater than 1.65, preferably greater than or equal to 1.70, better still greater than or equal to 1.8 and even better still greater than or equal to 2.0, and a layer is said to be a low-refractive-index layer when its refractive index is less than or equal to 1.65, preferably less than or equal to 1.55, better still less than or equal to 1.50 and even better still less than or equal to 1.45.

The interference coating may be any interference coating conventionally used in the field of optics, in particular of ophthalmic optics, except for the fact that it includes at least one layer having a refractive index greater than 1.65 and at least one layer having a refractive index less than or equal to 1.65, and that at least one of its layers is an organic-inorganic layer that was deposited under vacuum.

The interference coating can be, without limitation, an optical filter, an antireflection coating or a reflective (mirror) coating, preferably an antireflection coating.

An antireflection coating is defined as a coating, deposited at the surface of an article, which improves the antireflection properties of the final article. It makes it possible to reduce the reflection of light at the article-air interface over a relatively broad portion of the visible spectrum.

As is well known, interference coatings, preferably antireflection coatings, conventionally comprise a stack of dielectric materials forming high-refractive-index (HI) layers and low-refractive-index (LI) layers.

The HI layers are conventional layers of high refractive index, well known in the art. They generally comprise one or more mineral oxides, such as, without limitation, zirconia ($ZrO_2$), titanium dioxide ($TiO_2$), tantalum pentoxide ($Ta_2O_5$), neodymium oxide ($Nd_2O_5$), hafnium oxide ($HfO_2$), praseodymium oxide ($Pr_2O_3$), praseodymium titanate ($PrTiO_3$), $La_2O_3$, $Nb_2O_5$, $Y_2O_3$, indium oxide $In_2O_3$ or tin oxide $SnO_2$. Preferred materials are $TiO_2$, $Ta_2O_5$, $PrTiO_3$, $ZrO_2$, $SnO_2$, $In_2O_3$ and mixtures thereof.

The LI layers are also well known and can comprise, without limitation, $SiO_2$, $MgF_2$, $ZrF_4$, alumina ($Al_2O_3$) in a small proportion, $AlF_3$, and mixtures thereof, preferably $SiO_2$. Use may also be made of SiOF (fluorine-doped $SiO_2$) layers. Ideally, the interference coating of the invention does not comprise any layer comprising a mixture of silica and alumina.

The total thickness of the interference coating is generally greater than 100 nm and preferably greater than one of the following values: 500 nm, 600 nm, 700 nm, 800 nm, 900 nm, 1 micron, 1.1 microns, 1.2 microns.

The total thickness of the interference coating is preferably less than or equal to 2 microns and even better still less than or equal to 1.5 µm. In one embodiment, the total thickness of the interference coating is less than or equal to 1 µm.

The process of the invention is particularly advantageous for the lamination of multilayer interference coatings that are thick or that possess thick layers or a high number of layers. Specifically, interference stacks of this type are naturally more fragile from a mechanical point of view. The fact that a multilayer interference coating that is thick or that possesses thick layers or a high number of layers includes at least one organic-inorganic layer according to the invention enables it to prevent the cracks due to the lamination process.

Preferably again, the interference coating, which is preferably an antireflection coating, comprises at least two low-refractive-index (LI) layers and at least two high-refractive-index (HI) layers. The total number of layers in the interference coating is preferably greater than or equal to 8, better still greater than or equal to 9, and even better still greater than or equal to 10. In certain embodiments, the total number of layers in the interference coating is less than or equal to 8 and better still less than or equal to 6.

It is not necessary for the HI and LI layers to alternate in the interference coating, although they can be alternating according to one embodiment of the invention. Two (or more) HI layers can be deposited on one another, just as two (or more) LI layers can be deposited on one another.

According to one embodiment, all the low-refractive-index layers of the interference coating are identical or different organic-inorganic layers. In another embodiment, the external layer of the multilayer interference coating, that is to say the layer of the interference coating furthest from the substrate in the order of stacking, is a low-refractive-index organic-inorganic layer. A low-refractive-index organic-inorganic layer (having a refractive index of less than or equal to 1.65), denoted layer A, is preferably deposited directly on a high-refractive-index layer.

Preferably, the external layer of the interference coating is a low-refractive-index layer that is preferably located directly in contact with a subjacent high-refractive-index layer. According to another embodiment, all the high-refractive-index layers of the interference coating are identical or different organic-inorganic layers. In certain articles according to the invention, the first layer of the interference coating, in the order of deposition, is a high-refractive-index organic-inorganic layer. A high-refractive-index organic-inorganic layer according to the invention (having a refractive index of greater than 1.65) is denoted layer B.

According to one preferred embodiment, all the layers of the interference coating are organic-inorganic layers. In this case, the interference coating may be composed of an alternation of layers A and B according to the invention in direct contact with one another.

According to another embodiment, all the layers of the interference coating comprise at least one organosilicon compound that may be chosen from the organosilicon compounds described below.

According to one embodiment of the invention, the interference coating comprises a sublayer. It is in this case generally the first layer of this interference coating in the order of deposition of the layers, i.e. the layer of the interference coating that is in contact with the thermoplastic support film.

"Sublayer of the interference coating" is understood to mean a coating of relatively great thickness used with the aim of improving the resistance to abrasion and/or to scratches of said coating and/or to promote its adhesion to the thermoplastic film. The sublayer according to the invention can be chosen from the sublayers described in the application WO 2010/109154. The sublayer may also be a layer of organic-inorganic nature or comprise a layer of organic-inorganic nature. In this case, said layer of organic-inorganic nature comprised in or forming the sublayer is preferably a layer A.

Preferably, the sublayer has a thickness of 100 to 200 nm. It is preferably exclusively mineral/inorganic in nature and preferably consists of silica $SiO_2$.

The article of the invention can be rendered antistatic by virtue of the incorporation, preferably into the interference coating, of at least one electrically conductive layer. The nature and the location in the stack of the electrically conductive layer which can be used in the invention are described in more detail in the application WO 2013/098531. It is preferably a layer with a thickness of 1 to 20 nm preferably comprising at least one metal oxide chosen from indium tin oxide ($In_2O_3$:Sn, tin-doped indium oxide, denoted ITO), indium oxide ($In_2O_3$) and tin oxide ($SnO_2$).

The various layers of the interference coating other than those described above are preferably deposited by vacuum deposition using one of the following techniques: i) evaporation, optionally ion-beam-assisted evaporation, ii) ion-beam sputtering, iii) cathode sputtering or iv) plasma-enhanced chemical vapor deposition. These various techniques are described in the works "Thin Film Processes" and "Thin Film Processes II", edited by Vossen and Kern, Academic Press, 1978 and 1991, respectively. A particularly recommended technique is the vacuum evaporation technique. Preferably, each of the layers of the interference coating is deposited by vacuum evaporation.

The organic-inorganic layer of the interference coating preferably comprises atoms of carbon, of oxygen, and of a metal or metalloid chosen from silicon, zirconium, titanium and niobium, preferably silicon. In the latter case, it is an organosilicon layer. It is preferably obtained by depositing at least one organosilicon compound, under vacuum. The deposition of the organic-inorganic layer is preferably assisted by a source of ions. The deposition assisted by a source of ions is preferably an ion bombardment, generally carried out with an ion gun. A layer formed from an organosilicon compound is a layer of organic-inorganic nature insofar as the deposition process is such that the deposited layer comprises atoms of carbon, of oxygen, and of a metal or metalloid.

In one embodiment, the organic-inorganic layer is a high-refractive-index layer, denoted layer B, which is preferably obtained by vacuum deposition of at least one high-refractive-index metal oxide and of at least one organosilicon compound B. This deposition is preferably assisted by a source of ions, better still a beam of ions, even better still an ion gun.

The precursor metal oxide of the layer B is a high-refractive-index metal oxide, which expression was defined above. It may be chosen from metal oxides and mixtures thereof suitable for the high-refractive-index layers described above, or from substoichiometric metal oxides such as a substoichiometric titanium or zirconium oxide, of respective formulae $TiOx$ and $ZrOx$, with $x<2$, x preferably varying from 0.2 to 1.2.

It is preferably the oxide $TiO_2$ or a substoichiometric titanium oxide such as the compounds $TiO$, $Ti_2O_3$, or $Ti_3O_5$, or else a hafnium oxide.

The use of titanium oxide is advantageous due to the high refractive index of this metal oxide. The refractive index of $TiO_2$ in the rutile form is effectively of the order of 2.65 at 550 nm. Thus, the layer B can retain a high refractive index 1.8), even if the titanium oxide is mixed with an organosilicon compound B of lower refractive index.

Preferably, the refractive index of the layer B is greater than or equal to at least one of the following values: 1.7, 1.8, 1.9, 2.0, 2.05 and ideally greater than or equal to 2.1.

The layer B of the final article preferably contains at least one metal oxide having a refractive index greater than or equal to 1.8. This metal oxide may be the same as the precursor metal oxide used to form the layer B and described above or be different therefrom, insofar as the deposition process of the layer B may induce a modification of the precursor metal oxide such as an oxidation. It is preferably a titanium oxide, in particular the compound $TiO_2$.

The layer B is formed from a material obtained by vacuum deposition, preferably under assistance by a source of ions (in particular an ion beam) and preferably under ion bombardment, in particular by co-evaporation, of two categories of precursors in gaseous form: at least one metal oxide and at least one organosilicon compound B. This technique of deposition under a beam of ions makes it possible to obtain activated species resulting from at least one organosilicon compound B and from at least one metal oxide, in the gaseous form.

In the present patent application, oxides of metalloids are considered as being metal oxides, and the generic term "metal" also designates metalloids.

In one embodiment, the organic-inorganic layer is a low-refractive-index layer, denoted layer A, which is preferably obtained by vacuum deposition and in particular by evaporation or co-evaporation, of, depending on the circumstances, one or two categories of precursors in gaseous form: at least one organosilicon compound A and optionally at least one inorganic compound, which is preferably a metal oxide. The following description will generally make reference to the precursor metal oxide of the layer A but will also be applicable to the case where the precursor inorganic compound is not a metal oxide. This deposition is preferably assisted by a source of ions (in particular a beam of ions) and ideally under ion bombardment. This technique of deposition under a beam of ions makes it possible to obtain activated species resulting from at least one organosilicon compound A and from at least one metal oxide (when it is present), in gaseous form.

The optional precursor inorganic compound of the layer A is preferably a low-refractive-index metal oxide, which expression was defined above. It may be chosen from metal oxides and mixtures thereof suitable for the low-refractive-index layers described above, or from substoichiometric metal oxides such as a substoichiometric silicon oxide, of formula $SiO_x$, with $x<2$, x preferably varying from 0.2 to 1.2. It is preferably oxides $SiO_2$ or SiO or mixtures thereof, ideally $SiO_2$.

The refractive index of the layer A is less than or equal to 1.65 and preferably less than or equal to 1.50. According to embodiments of the invention the refractive index of the layer A is greater than or equal to 1.45, better still greater than 1.47, even better still greater than or equal to 1.48 and ideally greater than or equal to 1.49.

Examples of antireflection coatings that can be deformed without being damaged in accordance with the invention are the following coatings:
an antireflection coating having, in order of deposition on the thermoplastic film, a 20 nm thick layer of $ZrO_2$, a 25 nm thick layer of $SiO_2$, an 80 nm thick layer of $ZrO_2$, a 6 nm thick layer of indium tin oxide (ITO), and an 80 nm thick organic-inorganic layer, obtained by ion-assisted vacuum deposition of OMCTS,
an antireflection coating having, in order of deposition on the thermoplastic film, a 20 nm thick layer of $ZrO_2$, a 25 nm thick layer of $SiO_2$, an 80 nm thick layer of $ZrO_2$, a 6 nm thick layer of indium tin oxide (ITO), and a 70 nm thick organic-inorganic layer, obtained by ion-assisted vacuum deposition of OMCTS, and a 10 nm thick layer of $SiO_2$.

Preferably, the deposition of the organic-inorganic layers is carried out in a vacuum chamber comprising an ion gun directed toward the substrates to be coated, which emits, toward said substrates, a beam of positive ions generated in a plasma within the ion gun. Preferably, the ions resulting from the ion gun are particles consisting of gas atoms from which one or more electron(s) have been stripped and which are formed from a noble gas, oxygen or a mixture of two or more of these gases.

As the organic-inorganic layers are formed by vacuum deposition, they do not comprise organosilicon compound hydrolysate and thus differ from sol-gel coatings obtained by wet processing.

Precursors, namely the organosilicon compound B and the metal oxide (in the case of the layer B) or the organosilicon compound A and the optional inorganic compounds (in the case of the layer A), are introduced or pass in a gaseous state into the vacuum chamber. They are preferably conveyed in the direction of the ion beam and are activated under the effect of the ion gun.

Without wishing to be restricted by any one theory, the inventors believe that, in the case of the layer B, the ion gun induces an activation/dissociation of the precursor compound B and of the precursor metal oxide, which would form an organic-inorganic layer containing M-O—Si-CHx bonds, M denoting the metal atom of the metal oxide, and that a similar process takes place in the case of the layer A when the latter is formed from a metal oxide. In the absence of metal oxide, the dissociation of the precursor compounds, in particular the organosilicon compounds, releases organic radicals that are deposited on the substrate.

This deposition technique using an ion gun and a gaseous precursor, sometimes denoted by "ion beam deposition", is described in particular, with only organic precursors, in U.S. Pat. No. 5,508,368. It allows layers with low mechanical stresses to be formed.

According to the invention, preferably, the only place in the chamber where a plasma is generated is the ion gun.

The ions may, if required, be neutralized before they exit the ion gun. In this case, the bombardment will still be regarded as being ion bombardment. The ion bombardment causes an atomic rearrangement in and a densification of the layer being deposited, which makes it possible to tamp it down while it is in the course of being formed and has the advantage of increasing its refractive index because of its densification.

During the implementation of the process according to the invention, the surface to be treated is preferably bombarded by ions with a current density generally of between 20 and 1000 $\mu A/cm^2$, preferably between 30 and 500 $\mu A/cm^2$ and better still between 30 and 200 $\mu A/cm^2$, over the activated surface, and generally under a residual pressure in the vacuum chamber which can range from $6\times10^{-5}$ mbar to $2\times10^{-4}$ mbar and preferably from $8\times10^{-5}$ mbar to $2\times10^{-4}$ mbar. An argon and/or oxygen ion beam is preferably used. When a mixture of argon and oxygen is employed, the $Ar/O_2$ molar ratio is preferably ≤1, better still ≤0.75 and even better still ≤0.5. This ratio can be controlled by adjusting the gas flow rates in the ion gun. The argon flow rate generally varies from 0 to 30 sccm. Preferably, no noble gases are used. The oxygen $O_2$ flow rate preferably varies from 5 to 30 sccm, and rises in proportion as the flow rate of the precursor compounds of the layers A and B increases.

The ions of the ion beam, preferentially resulting from an ion gun, used during the deposition of the layer A and/or B preferably have an energy ranging from 5 to 1000 eV, better still from 5 to 500 eV, preferentially from 75 to 150 eV, more preferentially from 80 to 140 eV and better still from 90 to 110 eV. The activated species formed are typically radicals or ions.

In the event of ion bombardment during the deposition, it is possible to carry out a plasma treatment concomitant or nonconcomitant with the deposition under an ion beam of the layers A and/or B. These layers are preferably deposited without the assistance of a plasma at the level of the substrates.

The deposition of the layers A and/or B, which may be carried out using identical or different methods, is done in the presence of an oxygen source when the precursor compound in question (A and/or B) does not contain (or does not contain enough) oxygen atoms and when it is desired for the corresponding layer to contain a certain proportion of oxygen. Likewise, the layers A and/or B are deposited in the presence of a nitrogen source when the precursor compound in question (A and/or B) does not contain (or does not contain enough) nitrogen atoms and when it is desired for the corresponding layer to contain a certain proportion of nitrogen. Generally, it is preferable to introduce oxygen gas with, if appropriate, a low content of nitrogen gas, preferably in the absence of nitrogen gas.

Besides the organic-inorganic layers, other layers of the interference coating can be deposited under ion bombardment as described above, that is to say by using bombardment by means of an ion beam of the layer being formed, which ions are preferably emitted by an ion gun.

The preferred method for the vaporization of the precursor materials of the organic-inorganic layers, carried out under vacuum, is physical vapor deposition, in particular vacuum evaporation, generally combined with a heating of the compounds to be evaporated. It can be deployed by using evaporation systems as diverse as a Joule-effect heat source (the Joule effect is the thermal manifestation of the electrical resistance) or an electron gun for the liquid or solid precursors, it being possible for any other device known to a person skilled in the art to also be used.

The organosilicon precursor compounds A and B are preferably introduced into the vacuum chamber in which articles according to the invention are produced in gaseous form, while controlling the flow rate thereof. This means that they are preferably not vaporized in the interior of the vacuum chamber (contrary to the precursor metal oxides).

Preferably, the employed metal oxides are preheated so as to reach a molten state then evaporated. They are preferably deposited by vacuum evaporation using an electron gun in order to bring about their vaporization.

In the case of the layer B, the precursor compound B and the precursor metal oxide are preferably deposited concomitantly (for example by co-evaporation) or partially concomitantly, that is to say with overlapping of the stages of deposition of both precursors. In the latter case, the deposition of one of the two precursors begins before the deposition of the other, the deposition of the second precursor beginning before the end of the deposition of the first precursor. The same goes for the layer A when the latter is formed from an inorganic compound.

The organosilicon compounds A and B, respective precursors of the layers A and B, are of organic nature and are independent of each other. They may therefore be identical or different, and contain in their structure at least one silicon atom and at least one carbon atom. They preferably include at least one Si—C bond and preferably include at least one hydrogen atom. According to one embodiment, the compound A and/or B comprises at least one nitrogen atom and/or at least one oxygen atom, preferably at least one oxygen atom.

The concentration of each chemical element in the layers A and B (metal M, Si, O, C, H, N, etc.) can be determined using the RBS (Rutherford Backscattering Spectrometry) technique or ERDA (Elastic Recoil Detection Analysis).

The atomic percentage of metal atoms in the layer B preferably varies from 10 to 30%. The atomic percentage of carbon atoms in the layer B preferably varies from 10 to 20%. The atomic percentage of hydrogen atoms in the layer B preferably varies from 10 to 30%. The atomic percentage of silicon atoms in the layer B preferably varies from 10 to 20%. The atomic percentage of oxygen atoms in the layer B preferably varies from 20 to 40%.

The atomic percentage of metal atoms in the layer A preferably varies from 0 to 15%. The atomic percentage of carbon atoms in the layer A preferably ranges from 10 to 25%, better still from 15 to 25%. The atomic percentage of hydrogen atoms in the layer A preferably ranges from 10 to 40%, better still from 10 to 20%. The atomic percentage of silicon atoms in the layer A preferably ranges from 5 to 30%, better still from 15 to 25%. The atomic percentage of oxygen atoms in the layer A preferably ranges from 20 to 60%, better still from 35 to 45%.

The following compounds are nonlimiting examples of cyclic or noncyclic organic compounds A and/or B: octamethylcyclotetrasiloxane (OMCTS), decamethyl cyclopentasiloxane, dodecamethylcyclohexasiloxane, hexamethylcyclotrisiloxane, hexamethyldisiloxane (HMDSO), octamethyltrisiloxane, decamethyltetrasiloxane, dodecamethylpentasiloxane, tetraethoxysilane, vinyltrimethylsilane, hexamethyldisilazane, hexamethyldisilane, hexamethylcyclotrisilazane, vinylmethyldiethoxysilane, divinyltetramethyldisiloxane, tetramethyldisiloxane, polydimethylsiloxane (PDMS), polyphenylmethylsiloxane (PPMS) or a tetraalkylsilane, such as tetramethylsilane.

Preferably, the organosilicon compound A and/or B comprises at least one silicon atom bearing at least one alkyl group, preferably a $C_1$-$C_4$ alkyl group, better still at least one silicon atom bearing one or two identical or different alkyl groups, preferably $C_1$-$C_4$ alkyl groups, for example the methyl group.

The preferred precursor compounds A and/or B comprise an Si—O—Si group, better still a divalent group of formula (3):

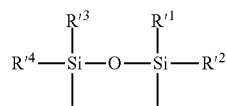

where $R'^1$ to $R'^4$ independently denote linear or branched alkyl or vinyl groups, preferably $C_1$-$C_4$ groups, for example the methyl group, monocyclic or polycyclic aryl groups, the hydroxyl group or hydrolysable groups. Nonlimiting examples of hydrolysable groups are the following groups: H, halogen (chloro, bromo, iodo, etc.), alkoxy, aryloxy, acyloxy, —$NR^1R^2$, where $R^1$ and $R^2$ independently denote a hydrogen atom, an alkyl group or an aryl group, and —$N(R^3)$—Si, where $R^3$ denotes a hydrogen atom, a linear or branched alkyl group, preferably a $C_1$-$C_4$ alkyl group, or a monocyclic or polycyclic aryl group, preferably a monocyclic aryl group. Groups comprising an Si—O—Si chain member are not considered to be "hydrolysable groups" within the meaning of the invention. The preferred hydrolysable group is the hydrogen atom.

According to another embodiment, the precursor compound A and/or B corresponds to the formula:

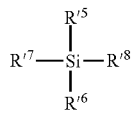

in which $R'^5$, $R'^6$, $R'^7$ and $R'^8$ independently denote hydroxyl groups or hydrolysable groups, such as OR groups, in which R is an alkyl group.

According to a first embodiment, the compound A and/or B comprises at least one silicon atom bearing two identical or different alkyl groups, preferably $C_1$-$C_4$ alkyl groups. According to this first embodiment, the compound A and/or B is preferably a compound of formula (3) in which $R'^1$ to $R'^4$ independently denote alkyl groups, preferably $C_1$-$C_4$ alkyl groups, for example the methyl group.

Preferably, the silicon atom or atoms of the compound A and/or of the compound B when it is present do not comprise any hydrolysable group or hydroxyl group in this embodiment.

The one or more silicon atoms of the precursor compound A and/or B of the layer A and/or B are preferably solely bonded to alkyl groups and/or groups comprising an —O—Si or —NH—Si chain member, so as to form an Si—O—Si or Si—NH—Si group. The preferred precursor compounds of the layer A and/or B are OMCTS and HMDSO.

It is preferably a cyclic polysiloxane of formula (4):

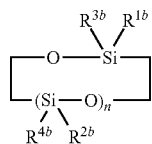

where n designates an integer ranging from 2 to 20, preferably from 3 to 8, and $R^{1b}$ to $R^{4b}$ independently represent linear or branched alkyl groups, preferably $C_1$-$C_4$ alkyl groups (for example the methyl group), vinyl groups, aryl groups or a hydrolysable group. The preferred members belonging to this group are octaalkylcyclotetrasiloxanes (n=3), preferably octamethylcyclotetrasiloxane (OMCTS). In some cases, the layer A and/or B results from a mixture of a certain number of compounds of formula (4), where n can vary within the limits indicated above.

According to a second embodiment, the compound A and/or B comprises, in its structure, at least one Si—X' group, where X' is a hydroxyl group or a hydrolysable group, which can be chosen, without limitation, from the following groups: H, halogen, alkoxy, aryloxy, acyloxy, —$NR^1R^2$, where $R^1$ and $R^2$ independently denote a hydrogen atom, an alkyl group or an aryl group, and —N($R^3$)—Si, where $R^3$ denotes a hydrogen atom, an alkyl group or an aryl group.

According to this second embodiment of the invention, the compound A and/or B preferably comprises, in its structure, at least one Si—H group, that is to say constitutes a silicon hydride. Preferably, the silicon atom of the Si—X' group is not bonded to more than two non-hydrolysable groups, such as alkyl or aryl groups.

Among the X' groups, the acyloxy groups preferably have the formula —O—C(O)$R^4$, where $R^4$ is an aryl group, preferably a $C_6$-$C_{12}$ aryl group, optionally substituted by one or more functional groups, or an alkyl group, preferably a linear or branched $C_1$-$C_6$ alkyl group, optionally substituted by one or more functional groups and additionally being able to comprise one or more double bonds, such as the phenyl, methyl or ethyl groups, the aryloxy and alkoxy groups have the formula —O—$R^5$, where $R^5$ is an aryl group, preferably a $C_6$-$C_{12}$ aryl group, optionally substituted by one or more functional groups, or an alkyl group, preferably a linear or branched $C_1$-$C_6$ alkyl group, optionally substituted by one or more functional groups and additionally being able to comprise one or more double bonds, such as the phenyl, methyl or ethyl groups, the halogens are preferably F, Cl, Br or I, the X' groups of formula —$NR^1R^2$ can denote an amino $NH_2$, alkylamino, arylamino, dialkylamino or diarylamino group, $R^1$ and $R^2$ independently denoting a hydrogen atom, an aryl group, preferably a $C_6$-$C_{12}$ aryl group, optionally substituted by one or more functional groups, or an alkyl group, preferably a linear or branched $C_1$-$C_6$ alkyl group, optionally substituted by one or more functional groups and additionally being able to comprise one or more double bonds, such as the phenyl, methyl or ethyl groups, the X' groups of formula —N($R^3$)—Si are attached to the silicon atom via their nitrogen atom and their silicon atom naturally comprises three other substituents, where $R^3$ denotes a hydrogen atom, an aryl group, preferably a $C_6$-$C_{12}$ aryl group, optionally substituted by one or more functional groups, or an alkyl group, preferably a linear or branched $C_1$-$C_6$ alkyl group, optionally substituted by one or more functional groups and additionally being able to comprise one or more double bonds, such as the phenyl, methyl or ethyl groups.

The preferred acyloxy group is the acetoxy group. The preferred aryloxy group is the phenoxy group. The preferred halogen group is the Cl group. The preferred alkoxy groups are the methoxy and ethoxy groups.

In the second embodiment, the compound A and/or B preferably comprises at least one silicon atom bearing at least one linear or branched alkyl group, preferably a $C_1$-$C_4$ alkyl group, better still at least one silicon atom bearing one or two identical or different alkyl groups, preferably $C_1$-$C_4$ alkyl groups, and an X' group (preferably a hydrogen atom) directly bonded to the silicon atom, X' having the meaning indicated above. The preferred alkyl group is the methyl group. The vinyl group can also be used instead of an alkyl group. Preferably, the silicon atom of the Si—X' group is directly bonded to at least one carbon atom.

Preferably, each silicon atom of the compound A and/or B is not directly bonded to more than two X' groups, better still is not directly bonded to more than one X' group (preferably a hydrogen atom) and better still each silicon atom of the compound A and/or B is directly bonded to a single X' group (preferably a hydrogen atom). Preferably, the compound A and/or B comprises an Si/O atomic ratio equal to 1. Preferably, the compound A and/or B comprises a C/Si atomic ratio <2, preferably ≤1.8, better still ≤1.6 and even better still ≤1.5, ≤1.3 and optimally equal to 1. Preferably again, the compound A and/or B comprises a C/O atomic ratio equal to 1. According to one embodiment, the compound A and/or B does not comprise an Si—N group and better still does not comprise a nitrogen atom.

The one or more silicon atoms of the precursor compound A and/or B are preferably solely bonded to alkyl or hydrogen groups and/or groups comprising an —O—Si or —NH—Si chain member, so as to form an Si—O—Si or Si—NH—Si group. In one embodiment, the compound A and/or B comprises at least one Si—O—Si—X' group or at least one Si—NH—Si—X' group, X' having the meaning indicated above and preferably representing a hydrogen atom.

According to this second embodiment, the compound A and/or B is preferably a compound of formula (3) in which at least one of $R'^1$ to $R'^4$ denotes an X' group (preferably a hydrogen atom), X' having the meaning indicated above.

According to this second embodiment, the compound A and/or B is preferably a cyclic polysiloxane of formula (5):

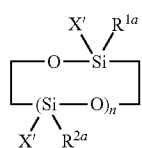

where X' has the meaning indicated above and preferably represents a hydrogen atom, n designates an integer ranging from 2 to 20, preferably from 3 to 8, and $R^{1a}$ and $R^{2a}$ independently represent an alkyl group, preferably a $C_1$-$C_4$ alkyl group (for example the methyl group), vinyl group, aryl group or a hydrolysable group. Nonlimiting examples of hydrolysable X' groups are the chloro, bromo, alkoxy, acyloxy, aryloxy and H groups. The commonest members belonging to this group are the tetra-, penta- and hexaalkylcyclotetrasiloxanes, preferably the tetra-, penta- and hexamethylcyclotetrasiloxanes, 2,4,6,8-tetramethylcyclotetrasiloxane (TMCTS) being the preferred compound. In some cases, the layer A and/or B results from a mixture of a certain number of compounds having the above formula, where n can vary within the limits indicated above.

According to another embodiment, the compound A and/or B is a linear alkylhydrosiloxane, better still a linear methylhydrosiloxane, such as, for example, 1,1,1,3,5,7,7,7-octamethyltetrasiloxane, 1,1,1,3,5,5,5-heptamethyltrisiloxane or 1,1,3,3,5,5-hexamethyltrisiloxane.

The following compounds are nonlimiting examples of cyclic or non cyclic organic precursor compounds A and/or B in accordance with the second embodiment: 2,4,6,8-tetramethylcyclotetrasiloxane (TMCTS of formula (1)), 2,4,6,8-tetraethylcyclotetrasiloxane, 2,4,6,8-tetraphenylcyclotetrasiloxane, 2,4,6,8-tetraoctylcyclotetrasiloxane, 2,2,4,6,6,8-hexamethylcyclotetrasiloxane, 2,4,6-trimethylcyclotrisiloxane, cyclotetrasiloxane, 1,3,5,7,9-pentamethylcyclopentasiloxane, 2,4,6,8,10-hexamethylcyclohexasiloxane, 1,1,1,3,5,7,7,7-octamethyltetrasiloxane, 1,1,3,3,5,5-hexamethyltrisiloxane, tetramethyldisiloxane, tetraethoxysilane, vinylmethyldiethoxysilane, a hexamethylcyclotrisilazane, such as 3,4,5,6-hexamethylcyclotrisilazane or 2,2,4,4,6,6-hexamethylcyclotrisilazane, 1,1,1,3,5,5,5-heptamethyltrisiloxane, tris(trimethylsiloxy)silane (of formula (2)), 1,1,3,3-tetramethyldisilazane, 1,2,3,4,5,6,7,8-octamethylcyclotetrasilazane, nonamethyltrisilazane, tris(dimethylsilyl)amine or hexamethyldisilazane.

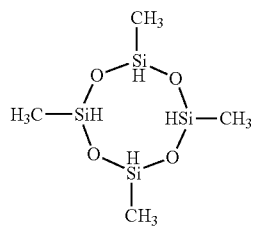

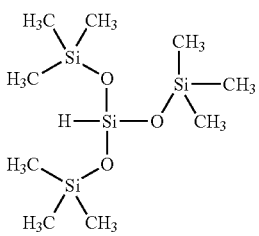

The use of at least one organosilicon compound B to form the layer B, which preferably comprises Si—C and optionally Si—O bonds, makes it possible to benefit from improved thermomechanical properties with respect to the conventional materials of high refractive index, such as $TiO_2$ or $ZrO_2$, in particular, the thermal resistance and the scratch resistance of the substrates coated with the layers B according to the invention are improved, levels hitherto inaccessible with conventional technologies, such as the ion-assisted deposition of purely inorganic layers, being achieved therewith while a high refractive index and a high transparency are maintained.

According to one embodiment of the invention, the layer B comprises more than 80% by weight, preferably more than 90% by weight, of compounds resulting from the compound B and the metal oxide according to the invention, with respect to the total weight of the layer B. According to one embodiment, the layer B is exclusively formed by vacuum deposition under ion bombardment of at least one metal oxide and of at least one organosilicon compound B, with the exclusion of any other precursor.

Preferably, the layer B contains from 5% to 70% by weight of organosilicon compounds B relative to the weight of the layer B.

The precursor inorganic compounds of the layer A (generally metal oxides), when they are present, are in a proportion such that the layer A preferably contains less than 30% by weight of inorganic compounds with respect to the weight of the layer A, preferably less than 20%, more preferably less than 10%, and better still less than 5%. According to one preferred embodiment, the organic-inorganic layer (or the layer A) is not formed from inorganic (mineral) precursor compounds such as mineral oxides and therefore does not contain any inorganic compounds such as metal oxides. In this case, the layer A is a layer that preferably contains only organosilicon compounds. Preferably, the amount of inorganic compounds or metal oxides in the layer A is less than 10% by weight with respect to the weight of the layer A, better still less than 5% and even better still less than 1%.

Preferably, the layer A contains more than 70% by weight of organosilicon compounds A with respect to the weight of the layer A, better still more than 80%, even better still more than 90% and ideally 100%.

The organic-inorganic layer preferably possesses a thickness ranging from 5 to 500 nm, preferably from 20 to 500 nm, more preferably from 25 to 250 nm or from 10 to 250 nm and better still from 30 to 200 nm. In one preferred embodiment, the interference coating contains at least one organic-inorganic layer having a thickness greater than or equal to 250 nm and better still greater than or equal to 300 nm.

In another embodiment, the sum of the thicknesses of the organic-inorganic layers of the interference coating is greater than or equal to 250 nm, better still greater than or equal to 300 nm and even better still greater than or equal to 500 nm.

When it forms the external layer of the interference coating, the organic-inorganic layer preferably has a thickness ranging from 60 to 200 nm. The duration of the deposition process, the flow rates and the pressures are adjusted so as to obtain the desired coating thicknesses.

The nature of the precursor compounds employed, their respective amounts (which can be modulated by adjusting the flow rates evaporated) and the deposition conditions, in particular the duration of the deposition, are examples of parameters that a person skilled in the art will be able to vary in order to obtain an interference coating comprising at least one organic-inorganic layer and having all of the desired properties.

According to the invention, the implementation process involves conforming the thermoplastic film coated with the multilayer interference coating to the shape of the optical article and adhering it to the surface thereof. Said film is laminated to the surface of the optical article, by bonding via an adhesive layer, said adhesive layer being positioned between the optical article and the surface of the thermoplastic film not coated with the interference coating.

Various families of adhesives may be used within the context of the invention. These adhesives preferably have an elastic modulus, or Young's modulus, of less than that of the substrate and less than that of the thermoplastic film. In general, the adhesive has an elastic modulus at room temperature of between $10^3$ and $10^8$ Pa. The adhesives according to the invention are preferably PSAs (pressure sensitive adhesives) and HMAs (hot-melt adhesives). The adhesive may also be liquid without needing to be heated.

The term "PSA" is understood to mean a dry-contact adhesive, generally of viscoelastic nature, which requires only slight pressure to adhere to the contact surface. PSAs are characterized by the fact that they require no activation by water, by a solvent or by heating in order for them to adhere permanently to a contact surface. Examples of PSAs that can be used are mentioned in application EP 2524798, in the name of the applicant, as are the additives that may contain these PSAs. Preferably, use will be made in the context of the invention of a polyacrylate-based PSA.

The PSA layer may be applied to the thermoplastic polymer film before or after application of functional coatings on this film, preferably after. It may optionally be protected by a release layer that will be debonded directly before the process is carried out.

It is also possible in the context of the invention to use a hot-melt adhesive (HMA), which term encompasses conventional HMAs that can melt and harden a large number of times, but also reactive HMAs that are applied like conventional HMAs but which crosslink and thus form permanent adhesive bonds that it is impossible to melt again. Examples of HMAs that can be used are mentioned in application EP 2524798, in the name of the applicant, as are the additives that may contain these HMAs. Preferably, use will be made in the context of the invention of a polyurethane-based hot-melt adhesive that is in the form of an aqueous dispersion of high-molecular-weight polyurethanes.

For the application envisaged in the present invention, it is important to choose the adhesive so as not to unwantedly reduce the transparency of the optical article obtained. The adhesive layer may of course have a cloudy appearance before application on the substrate but this cloudiness should disappear after bonding.

The thickness of the adhesive layer generally varies from 10 to 50 µm, preferably from 15 to 30 µm.

The adhesive layer may be applied to the face of the thermoplastic film opposite the one that has the interference coating, or else to the substrate of the optical article. Subsequently, the thermoplastic film is laminated on the substrate of the optical article.

According to one embodiment of the invention, the process comprises the following steps:

b1) thermoforming said coated thermoplastic film provided in step a) so as to conform it to the geometry of the surface of the optical article, generally by subjecting this film to a degree of deformation greater than or equal to 1% over at least one portion of its surface, and b2) applying to the substrate of the optical article said thermoplastic film obtained in step b1) by making it adhere using the layer of adhesive.

This thermoforming step, which precedes the lamination step, is preferably carried out at a temperature below the glass transition temperature of the polymer or blend of polymers forming the thermoplastic film. Its purpose is essentially to give the coated film a shape similar to that of the surface to which it will be bonded, in order to prevent stresses, creases or damage of the multilayer film during the bonding step.

The thermoforming therefore converts the flat or substantially flat coated thermoplastic film into a curved film, which retains this shape once cooled. It is also possible to laminate a heated coated thermoplastic film, said film undergoing the deformation conforming it to the geometry of the surface of the substrate during the lamination step.

The thermoforming and the lamination/bonding to the surface of the optical article of non-zero radius of curvature of the coated thermoplastic film on the substrate of the optical article may be carried out according to techniques and using devices that are known in the art. Mention may be made, as examples of such processes, of those described in detail in applications EP 2018262, EP 2524798, WO 2006/105999 and WO 2009/021793, in the name of the applicant.

According to the method presented in application WO 2006/105999, the substrate having a curved face is positioned on a substrate holder inside a chamber. The flat functional film is positioned in a film holder at the upper end of the chamber in order to close this chamber, then the chamber is positioned vertically in line with a (deformable) flexible stamp so that their respective geometric centers are aligned. The initially flat thermoplastic film is hot preformed by applying the flexible stamp to the film, the chamber is placed under negative pressure causing the substrate and the thermoplastic film to come into contact via their respective geometric centers on the curved-face side of the substrate, and the flexible stamp is translated vertically, establishing a conformal contact between the functional film and the substrate on its curved-face side. This process induces degrees of deformation in the film which may reach 10%.

The film transfer method presented in application WO 2009/021793 (cf. FIGS. 4-6 of that application) is similar, the direct immobilization of the functional film by the film holder over an annular outline being replaced by the immobilization of this functional film on an initially flat deformable support (auxiliary membrane or auxiliary film). The functional film is held immobilized on one face of the auxiliary membrane (of greater dimension than the functional film, cf. FIG. 1b of WO 2009/021793) by means of a binding layer configured so that the functional film has a shape which varies in accordance with the deformation of the membrane, the functional film then remaining parallel to the auxiliary membrane, only the auxiliary membrane being held by the film holder at its perimeter, the functional film only being held in contact with the auxiliary membrane by the binding layer.

Insofar as the functional film is in no way held at its periphery by mechanical means according to the lamination process described in application WO 2009/021793, it can slide over the support membrane while the auxiliary film is being deformed. Therefore, the second process creates smaller deformations in the functional film than if the functional film was deformed directly as disclosed in the first lamination process described in application WO 2006/105999. It is nevertheless possible to obtain degrees of deformation greater than or equal to 1%, especially when the functional film is enlarged relative to the support, which has the effect of increasing the deformation.

The implementation of the transfer process described in patent application WO 2009/021793 is carried out:
- as in patent application WO 2006/105999, i.e. a flexible stamp 201 (FIG. 6 of WO 2009/021793) is used to hot preform the functional film, giving it a curvature the convexity of which is turned toward the curved face of the substrate; the center of the convex face of the functional film is then brought into contact with the center of the convex curved face of the substrate, and then the functional film is applied with the flexible stamp by inverting the curvature thereof in order to gradually diffuse, radially from the center of the functional film to the periphery thereof, the conformal contact between the functional film and the substrate; or
- as a variant, a flexible stamp is not used (FIG. 4 of WO 2009/021793) and the negative pressure in the chamber is replaced by a positive pressure in order to hot preform the functional film, thereby giving it a curvature the concavity of which is turned toward the curved face of the substrate, the center of the concave face of the functional film is then brought into contact with the center of the convex curved face of the substrate, and then the film is applied, without inverting its curvature, by driving the substrate toward the film, in order to gradually diffuse, radially from the center of the film to the periphery thereof, the conformal contact between the functional film and the substrate.

For optical articles having a small curvature, it is possible to use the process from application WO 2006/105999 (which produces higher deformations) and to thus cover the whole of the surface of the substrate of the article. For optical articles having a larger curvature, it is recommended to use the process from application WO 2009/021793 (which produces lower deformations but which does not make it possible to cover the whole of the surface of the optical article). However, owing to use of an interference coating comprising at least one organic-inorganic layer, it is possible to use this second process for optical articles having a broader curvature range than if the interference coating had no organic-inorganic layers, insofar as it is possible to work with optical articles of higher curvatures without risking cracking the interference coating. It is also possible to use a coated thermoplastic film of larger dimensions. The invention therefore makes it possible to notably enlarge the working range in terms of curvature and surface area of optical article covered.

As shown in FIG. 2 of application WO 2009/021793, when the functional film is held immobilized on a face of the auxiliary membrane, the optical article is typically coated with a layer of liquid adhesive or pressure-sensitive adhesive (PSA), with the functional thermoplastic film in contact with the binding layer of the support (auxiliary membrane or auxiliary film).

After removal of the support and of the binding layer, an optical article is obtained to which the functional thermoplastic film adheres by means of a layer of cured liquid adhesive (HMA) or pressure-sensitive adhesive.

The lamination on at least one portion of the surface of the optical article of the coated thermoplastic film necessitates conforming it to the geometry of the surface of the optical article, which generally produces a deformation of this film, between its flat (or substantially flat) initial state and its curved state subjected to the curved face of the optical article, which has a non-zero radius of curvature. The radius of curvature of the surface of the optical article on which the lamination takes place generally varies from 48 to 350 mm. This surface may be convex or concave. The optical article generally has a diameter of between 55 and 90 mm.

The lamination is preferentially carried out by subjecting or after having subjected this film to a degree of deformation greater than or equal to 1% over at least one portion of its surface, so as to conform it to the geometry of the surface of said optical article. This degree of deformation is preferentially greater than or equal to one of the following values: 1.1%, 1.2%, 1.3%, 1.4%, 1.5%, 2%.

FIG. 1 shows an example of the distribution of the deformations undergone by the surface of an initially flat thermoplastic film after the application thereof to the surface of an optical article having a non-zero radius of curvature. The closer together the hatchings, the higher the value of the degree of deformation obtained. It is seen that the deformation is maximal in a central zone 37 of the surface of the thermoplastic film and that, except for certain local zones, the deformation decreases toward the edge of the film.

The representation of these deformations, given in FIG. 1 in the form of a map 36, was obtained using the technique described in the French patent application filed under the number FR1454589, based on the use of a deformation measurement system comprising an image capturing device comprising two cameras that take separate images in order to enable a three-dimensional reconstruction, and software for analysing the images provided by the cameras, in particular the stereo image correlation measurement system sold under the name ARAMIS by the company GOM. Owing to the presence of the two cameras, it is possible to quantify the movements at the surface of the film in the three directions of space, by means of the comparison between the images taken by the two cameras of the surface of the film in the flat initial state and in the state transferred to the surface of the curved optical article.

At any point of the surface, the degree of deformation according to the invention corresponds to the component of the deformation expressed along one direction of space such that the deformation is maximal at this point for the material in this direction.

According to one embodiment of the invention, the preparation process is expressed by the fact that at least one portion of the reflection spectrum in the visible range of the multilayer interference coating present on the thermoplastic film provided in step a) is moved toward short wavelengths under the effect of the deformation induced by conforming the coated thermoplastic film to the geometry of the surface of said optical article.

During the deformation of the thermoplastic film coated with interference coating, the positioning of its reflection spectrum may be modified due to a stretching of the layers that may result in a reduction in the thickness of the multilayer stack. This thickness variation is preferably less than 7%, better still less than 5%. It results in a shift of the reflection spectrum over the whole of the visible spectrum toward shorter wavelengths. Preferably, the shift/movement of the reflection spectrum in the visible range undergone by the multilayer interference coating between the initial state (coating present on the thermoplastic film provided in step a) and the final state (coating present on the laminated thermoplastic film at the end of step b) is less than or equal to 70 nm, better still less than or equal to 50 nm and even better still less than or equal to 30 nm.

Customarily, an interference coating is designed on the basis of given specifications, for example through numerical simulations, and a coating having a set of desired optical properties is deposited on a thermoplastic film with a view to applying it to an optical article by lamination. After lamination, these optical properties are however shifted to a set of values more or less distant from the target, due in particular to the modification of the thicknesses of the layers of the stack induced by the lamination process.

In the embodiment of the invention described above, it is possible to anticipate the movement of the reflection spectrum in the visible range of the interference film induced by the lamination process and in particular by the deformation of the coated thermoplastic film with a view to conforming it to the geometry of the surface of the optical article by designing an interference coating deposited on the thermoplastic film provided in step a) which takes into account the spectrum movement that will be caused by the shaping of the coated film. This interference coating, in its initial state (step a) has a reflection spectrum that is intentionally different from the desired reflection spectrum but for which it is known that after shaping, in particular by thermoforming, it will be suitably shifted.

The structure of the interference coating that has to be deposited on the thermoplastic film in order to result, after shaping, in the desired reflection spectrum may be anticipated by a person skilled in the art by carrying out preparatory experiments, in particular using the method described in the application filed under the number FR1454590, in the name of the applicant, or by simulation.

By knowing the mechanical properties, in particular the Poisson's ratio of the materials forming the thin layers, it is possible to calculate a change in thickness for a "lateral" deformation undergone.

The final thicknesses necessary for obtaining the desired optical properties are calculated, in a conventional manner (MacLeod or other commercial software). Next, for all the thicknesses, the changes calculated from known deformations are added, taking into account the Poisson's ratio, if it is known, or using an estimated Poisson's ratio (estimated from the literature) and the difference in performance is evaluated relative to the desired optical property or properties. Variations in the optical properties can thus be anticipated.

When the deformations are not uniform over the whole of the article, a person skilled in the art may take into account the highest deformation and the lowest deformation and simulate the optical properties (antireflection properties in particular).

A person skilled in the art may ultimately use one or other of the deformations or an average value.

According to another embodiment of the invention, the interference coating of the optical article recovered in step c) has a desired optical property having the value V, the value of said optical property of the interference coating present on the thermoplastic film that was provided in step a) being different from V, so as to take into account the deformation induced by laminating the coated thermoplastic film on the surface of said optical article (and in particular the conforming thereof to the geometry of the surface of said optical article), which has the effect of modifying the value of this optical property.

In the embodiment of the invention described above, the shift of the optical properties of the interference film induced by the lamination process and in particular by the deformation of the coated thermoplastic film with a view to conforming it to the geometry of the surface of the optical article is anticipated. Thus, the interference coating deposited on the thermoplastic film provided in step a) is designed to take into account the variation that will be caused by the shaping of the coated film. This interference coating, in its initial state (step a) has an optical property, the value V+ε of which is intentionally different from the desired final optical property (ε denoting the difference intentionally applied relative to the value of the desired optical property), but for which it is known that after shaping, in particular by thermoforming, it will be shifted toward the desired value V (at the end of step b). The value of the difference to be applied to the optical property may be anticipated by a person skilled in the art by carrying out preparatory experiments. Preferably, this difference c is less than or equal to 5% of the value V.

This value V may in particular be a value of Rm and/or Rv defined in the present application.

When a thermoforming of the coated thermoplastic film is carried out, the value V desired for the optical property in question may or may not be achieved at the end of the thermoforming step, this is because the step of applying the film to the substrate may (or may not) continue to modify the value of said optical property.

Among its advantageous properties, the article according to the invention possesses an increased resistance to bending and to cracking of the interference coating. The bending resistance of the article according to the invention may be evaluated by means of the bending-resistance test described in patent application WO 2013/098531. The forces applied in this test were representative of the forces applied at an opticians when fitting the eyeglass, i.e. when the eyeglass is "compressed" in order to be inserted into a metal frame. The result of the test was the critical deformation D in mm that the glass can experience before cracks appear. The higher the value of the deformation, the better the resistance to applied mechanical deformation. Generally, interference coatings according to the invention have critical deformation values ranging from 0.5 to 1.9 mm, better still from 0.8 to 1.6 mm and even better still from 0.9 to 1.5 mm.

The critical temperature of a coated article according to the invention is preferably greater than or equal to 60° C., better still greater than or equal to 70° C., even better still greater than or equal to 80° C. and ideally greater than or equal to 90° C. In the present patent application, the critical temperature of an article or a coating is defined as being the temperature starting from which cracks are observed to appear in the stack present at the surface of the substrate, which results in degradation of the coating. The critical temperature of the article is determined according to the protocol indicated in patent application WO 2008/001011. This high critical temperature is due to the presence of the organic-inorganic layer at the surface of the article. Moreover, this layer possesses a lower aptitude to take on water than evaporated inorganic layers, and its optical properties have an excellent stability over time.

Because of its improved thermomechanical properties, the organic-inorganic layer according to the invention may especially be applied to a single face of a semi-finished lens, generally its front face, the other face of this lens still needing to be machined and treated. The stack present on the front face of the lens will not be degraded by the increase in temperature generated by the treatments to which the back face will be subjected during the curing of the coatings which will have been deposited on this back face or any other action liable to increase the temperature of the lens.

Preferably, the average light reflection factor Rv is less than or equal to 2.5% per face. Rv is as defined in the ISO 13666:1998 standard, and measured according to the ISO 8980-4 standard at an angle of incidence of 15°. Preferably, Rv is less than 2% per face and even better still less than 1% per face, and better still less than or equal to 0.7% per face of the article.

Preferably, the average reflection factor in the visible range (400-700 nm) of an article coated with an interference coating according to the invention, denoted $R_m$, is less than 2.5% per face, better still less than 2% per face and even better still less than 1% per face of the article. In an optimal embodiment, the article comprises a substrate, the two main surfaces of which are coated with an interference coating according to the invention and which exhibits a total $R_m$ value (cumulative reflection due to the two faces) of less than 2%. Means for achieving such $R_m$ values are known to a person skilled in the art.

In the present patent application, the "average reflection factor" $R_m$ (average of the spectral reflection over the entire visible spectrum between 400 and 700 nm) is as defined in the ISO 13666:1998 standard and is measured according to the ISO 8980-4 standard.

In some applications, it is preferable for the main surface of the substrate to be coated with one or more functional coatings prior to the deposition of the interference coating. These functional coatings, which are conventionally used in optics, may, without limitation, be a primer layer for improving the impact resistance and/or adhesion of subsequent layers in the final product, an abrasion-resistant and/or scratch-resistant coating, a polarized coating, a photochromic coating, an electrochromic coating or a tinted coating, and may in particular be a primer layer coated with an abrasion-resistant and/or scratch-resistant coating such as those described above. It should be noted that if an abrasion-resistant and/or scratch-resistant coating is present on the thermoplastic film, it is unnecessary to provide a second one thereof beneath this film, in the order of stacking. Similarly, the thermoplastic film according to the invention bonded via an adhesive layer to the substrate of the optical article may in certain cases replace the primer conventionally used to improve the impact resistance and/or adhesion.

The article according to the invention may also comprise coatings, formed on the interference coating, capable of modifying the surface properties of the interference coating, such as a hydrophobic coating and/or oleophobic coating (anti-smudge top coat) or an anti-fogging coating. These coatings are preferably deposited on the external layer of the interference coating. They are generally less than or equal to 10 nm in thickness, preferably from 1 to 10 nm in thickness and better still from 1 to 5 nm in thickness. They are described in the applications WO 2009/047426 and WO 2011/080472 respectively.

Preferably, the coatings intended to appear on the interference coating in the final optical article are deposited thereon before the lamination step, while it is still supported by the thermoplastic film. In other words, the thermoplastic film according to the invention may be used to give an optical article numerous functionalities such as an abrasion-resistant, scratch-resistant, anti-fogging and/or anti-smudge function.

Typically, an article according to the invention comprises a substrate successively coated with a layer of adhesive, with the thermoplastic film, with an abrasion-resistant and/or scratch-resistant coating and with the multilayer interference coating comprising at least one organic-inorganic layer, and with a hydrophobic and/or oleophobic coating.

The invention also relates to an optical article having a non-zero radius of curvature comprising a substrate on which a layer of adhesive, a thermoplastic film and a multilayer interference coating are deposited, said thermoplastic film adhering to the surface of the lens by means of said layer of adhesive positioned between the optical article and the surface of the thermoplastic film not coated with the interference coating, said interference coating comprising at least one layer having a refractive index of greater than 1.65 and at least one layer having a refractive index of less than or equal to 1.65, at least one of the layers of the interference coating being a layer of organic-inorganic nature that has been deposited under vacuum, the article in question having been obtained according to the process described above, by lamination on the optical article, using said layer of adhesive, of said thermoplastic film coated with said multilayer interference coating, generally by subjecting or after having subjected this film to a degree of deformation greater than or equal to 1% over at least one portion of its surface, so as to conform it to the geometry of the surface of said optical article.

Moreover, the invention relates to an optical article having a non-zero radius of curvature comprising a substrate on which a layer of adhesive, a thermoplastic film and a multilayer interference coating are deposited, said thermoplastic film adhering to the surface of the lens by means of said layer of adhesive positioned between the optical article and the surface of the thermoplastic film not coated with interference coating, said interference coating comprising at least one layer having a refractive index of greater than 1.65 and at least one layer having a refractive index of less than or equal to 1.65, at least one of the layers of the interference coating being a layer of organic-inorganic nature that has been deposited under vacuum.

Finally, the invention relates to a thermoplastic film coated with a multilayer interference coating, said interference coating comprising at least one layer having a refractive index of greater than 1.65 and at least one layer having a refractive index of less than or equal to 1.65, at least one of the layers of the interference coating being a layer of organic-inorganic nature that has been deposited under vacuum.

The invention is illustrated in a nonlimiting way by the following examples.

EXAMPLES

The examples below illustrate specific films and processes that can be used within the context of the invention.

1—Production of an Antireflection Film with an Organic-Inorganic Layer

Use is made, as transparent thermoplastic film, of a cellulose triacetate film (FT 80 SZ sold by Fuji) having a thickness of 80 µm and a glass transition temperature, determined by dynamic mechanical analysis (DMA), of 170° C. The surface of this film is cleaned by treatment with an aqueous solution of sodium hydroxide, concentrated to 10%, at 60° C. for 4 minutes, followed by a step of rinsing with softened water and drying with hot air (60° C.).

Optionally, at least one of the surfaces of this film may comprise a coating by deposition on this surface, by spin coating, of a thermosetting solution for an abrasion-resistant coating (comprising, relative to the total weight of the composition, 22% of glycidoxypropylmethyldimethoxysilane, 62% of colloidal silica present at 30% in methanol, and 0.70% of aluminum acetylacetonate). The abrasion-resistant layer has a thickness of around 4 µm. This layer is subsequently subjected to crosslinking by heating at 100° C. for 3 hours. The thermosetting solution and the process for obtaining the abrasion-resistant coating are described in example 3 of the patent EP 0 614 957 B1.

Deposited under vacuum on one of the surfaces of this film, directly or on the abrasion-resistant coating if the film comprises one thereof, is an antireflection interference coating comprising an organic-inorganic layer.

1.1—Equipment

For the vacuum deposition of the antireflection coatings according to the invention, use is made of a commercial deposition machine (Leybold LAB 1100+), equipped with an electron gun, with a thermal evaporator, with a KRI EH 1000 F ion gun (from Kaufman & Robinson Inc.), and with a system for the introduction of liquid from Diamonex. This system comprises a tank for a precursor (precursor used: OMCTS), a liquid flowmeter and a vaporizer that is in the machine and which is brought to a temperature of 180° C. The precursor vapor exits from a copper pipe inside the machine, at a distance of ~50 cm from the ion gun. Flows of oxygen and argon are introduced into the ion gun.

1.2—General Deposition Process

For Depositing a Stack:

A primary pumping is carried out, then a secondary pumping for 400 s (pressure $\sim 2 \times 10^{-5}$ mbar, read on a capacitive pressure gauge), and preheating of the vaporizer to the chosen temperature (~5 min).

The film is then subjected to a "conventional" ion pre-cleaning (IPC) ion bombardment pretreatment using Ar.

In the case where it is desired to evaporate inorganic layers, the ion gun is shut down; if it is desired to continue with an organic-inorganic layer, the gun remains on.

If desired, evaporation of one (or more) inorganic layer(s) using the electron gun until the thickness desired for each layer is obtained.

If the ion gun is not operating, it is started up with argon. Next, addition of oxygen to the ion gun, with a programmed flow rate, then, if necessary, (if different from the IPC), the desired anode current is programmed.

The OMCTS precursor is then added (programmed liquid flow rate). The thickness of the deposit is measured in real time with the quartz measurement (microbalance). Once the desired thickness is obtained, the flow of precursor is stopped, then the ion gun too.

If desired, other inorganic layers may be evaporated using the electron gun. Optionally, a hydrophobic topcoat may be deposited on the last layer of the stack.

The deposition conditions of the inorganic layers (std) are those that appear in the procedure described in detail in patent application WO 2013/098531.

1.3 Stack Examples

The examples take into account the case where the organic-inorganic layer replaces the last optical layer of low refractive index of the antireflection stack, or a portion of this layer. By using the parameters 0.3 g/min (20 sccm) OMCTS, 0 sccm Ar, and 20 sccm $O_2$, 3 A anode current for the organic-inorganic layer, stacks of the following structures were deposited:

Structure A:

| Structure | Material | Thickness [nm] |
|---|---|---|
| Topcoat | std | std |
| Layer 4 | Organic-inorganic | 80 |
| Antistatic layer | ITO | 6 |
| Layer 3 | $ZrO_2$ (evap) | 80 |
| Layer 2 | $SiO_2$ (evap) | 25 |
| Layer 1 | $ZrO_2$ (evap) | 20 |

Structure B:

| Structure | Material | Thickness [nm] |
|---|---|---|
| Topcoat | std | std |
| Layer 4 | $SiO_2$ (evap) | 10 |
|  | Organic-inorganic | 70 |
| Antistatic layer | ITO | 6 |
| Layer 3 | $ZrO_2$ (evap) | 80 |
| Layer 2 | $SiO_2$ (evap) | 25 |
| Layer 1 | $ZrO_2$ (evap) | 20 |

Ranges of General Parameters Programmed for the Deposition of the Organic-Inorganic Layers of the Precursor in the Stacks of Structure A and B:

OMCTS flow rates: 0.1-0.8 g/min (1 to 50 sccm)

Vaporizer temperature: 80° C.-200° C. (to be chosen as a function of the OMCTS flow rate)

Argon flow rates: 0-30 sccm

Oxygen flow rates: 5-30 sccm (the oxygen flow rate is increased if the OMCTS flow rate is increased, to guarantee the transparency of the layer)

Anode current: 2-4 A Emission current:=anode current+(5-15%).

Comparative Example 1

| Structure | Material | Thickness [nm] | Conditions |
|---|---|---|---|
| Topcoat | std | std | std |
| Layer 4 | $SiO_2$ (evap) | 80 | std |
| AS layer | ITO (evap) | 6 | std |
| Layer 3 | $ZrO_2$ (evap) | 80 | std |
| Layer 2 | $SiO_2$ (evap) | 25 | std |
| Layer 1 | $ZrO_2$ (evap) | 20 | std |

The opposite face of the films thus obtained is then subjected to an oxygen plasma surface treatment under reduced pressure, and then a NITTO DENKO CS9621 acrylic PSA layer is applied thereto in a thickness of around 25 µm.

2—Lamination

Use is made of an organic glass ophthalmic lens made of thermoset polythiourethane having a refractive index of 1.6 sold by Essilor under the name Ormix® (MR8+0.00 D base 4.5, the radius of curvature of the convex face of which is 116 mm). The glass is subjected to an oxygen plasma surface treatment under reduced pressure.

The bonding of the film to the lens is carried out by means of the process described in WO 2006/105999 by applying a uniform pressure of around 0.03 MPa by means of a deformable stamp. After bonding of the film, a comparative glass has cracks whereas the glasses according to the invention are free of cracks.

The invention claimed is:

1. A process for preparing an optical article having a non-zero radius of curvature coated with an interference coating, comprising the following steps:
   a) providing a flat thermoplastic film coated with a multilayer interference coating, said interference coating comprising at least one layer having a refractive index of greater than 1.65 and at least one layer having a refractive index of less than or equal to 1.65, at least one of the layers of the interference coating being a layer of organic-inorganic nature that has been deposited under vacuum, with the assistance of a source of ions,
   b) laminating said coated flat thermoplastic film on an optical article having a non-zero radius of curvature comprising a substrate, by means of a layer of adhesive, said layer of adhesive being positioned between the optical article and a surface of the flat thermoplastic film not coated with the interference coating,
   c) recovering said optical article comprising a substrate coated with the layer of adhesive, the thermoplastic film and the multilayer interference coating,
   wherein said layer of organic-inorganic nature does not comprise organosilicon compound hydrolysates and is not a sol-gel coating; and
   wherein the interference coating of the optical article recovered in step c) has a desired optical property having a value V, and a value of said optical property of the interference coating present on the thermoplastic film provided in step a) is different from V, so as to take into account a deformation induced by laminating the coated flat thermoplastic film on a surface of said optical article which has an effect of modifying the value of this optical property.

2. The preparation process of claim 1, wherein at least one portion of a reflection spectrum in the visible range of the multilayer interference coating present on the thermoplastic film provided in step a) has a shift toward short wavelengths under the effect of the deformation induced by conforming the coated thermoplastic film to the geometry of the surface of said optical article.

3. The preparation process of claim 1, wherein step b) is carried out by subjecting or after having subjected the coated thermoplastic film to a degree of deformation greater than or equal to 1% over at least one portion of its surface, so as to conform it to a geometry of a surface of said optical article.

4. The preparation process of claim 1, wherein laminating step b) comprises:
   b1) thermoforming said coated thermoplastic film provided in step a) so as to conform it to a geometry of a surface of the optical article, and
   b2) applying to the substrate of the optical article said thermoplastic film obtained in step b1) by making it adhere using the layer of adhesive.

5. The preparation process of claim 1, wherein said layer of organic-inorganic nature comprises atoms of carbon, of oxygen and of a metal or metalloid.

6. The preparation process of claim 5, wherein the metal or metalloid is chosen from silicon, zirconium, titanium and niobium.

7. The preparation process of claim 1, wherein said layer of organic-inorganic nature is obtained by vacuum deposition, assisted by a source of ions, of at least one organosilicon compound.

8. The preparation process of claim 1, wherein said layer of organic-inorganic nature is obtained by vacuum deposition, assisted by a source of ions, of at least one titanium oxide and of at least one organosilicon compound.

9. The preparation process of claim 7, wherein that the deposition assisted by a source of ions is an ion bombardment.

10. The preparation process of claim 7, wherein the organosilicon compound comprises at least one divalent group of formula:

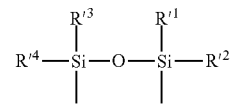

where $R'^1$ to $R'^4$ independently denote alkyl, vinyl, aryl or hydroxyl groups or hydrolysable groups, or wherein the compound corresponds to the formula:

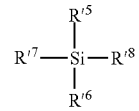

in which $R'^5$, $R'^6$, $R'^7$ and $R'^8$ independently denote hydroxyl groups or hydrolysable groups, such as OR groups, in which R is an alkyl group.

11. The preparation process of claim 7, wherein the organosilicon compound is chosen from octamethylcyclotetrasiloxane, 2,4,6,8-tetramethylcyclotetrasiloxane, decamethyltetrasiloxane, decamethylcyclopentasiloxane, dodecamethylpentasiloxane, and hexamethyldisiloxane.

12. The preparation process of claim 1, wherein said layer of organic-inorganic nature has a thickness ranging from 5 to 500 nm.

13. The preparation process of claim 1, wherein the interference coating is an antireflection coating or an optical filter.

14. The preparation process of claim 3, wherein the degree of deformation is greater than or equal to 1.2%, better still greater than or equal to 1.5%.

15. The preparation process of claim 1, wherein the optical article is an ophthalmic lens.

16. The preparation process of claim 1, wherein the radius of curvature of the surface of the optical article on which the lamination takes place varies from 48 to 350 mm.

17. An optical article having a non-zero radius of curvature comprising a substrate on which a layer of adhesive, a thermoplastic film and a multilayer interference coating are deposited, said thermoplastic film adhering to the surface of the substrate by means of said layer of adhesive positioned between the optical article and the surface of the thermoplastic film not coated with interference coating, said interference coating comprising at least one layer having a refractive index of greater than 1.65 and at least one layer having a refractive index of less than or equal to 1.65, at least one of the layers of the interference coating being a layer of organic-inorganic nature that does not comprise organosilicon compound hydrolysates and is not a sol-gel coating and has been deposited under vacuum with the assistance of a source of ions, wherein the optical article was obtained by the process of claim 1.

\* \* \* \* \*